(12) United States Patent  
Duplessis et al.

(10) Patent No.: US 9,109,811 B2  
(45) Date of Patent: Aug. 18, 2015

(54) HEAT PUMP WATER HEATER ASSEMBLY

(71) Applicant: General Electric Company, Schenectady, NY (US)

(72) Inventors: Samuel Duplessis, Louisville, KY (US); Eliel Fresco Rodriguez, Dayton, OH (US)

(73) Assignee: General Electric Company, Schenectady, NY (US)

( * ) Notice: Subject to any disclaimer, the term of this patent is extended or adjusted under 35 U.S.C. 154(b) by 332 days.

(21) Appl. No.: 13/707,916

(22) Filed: Dec. 7, 2012

(65) Prior Publication Data

US 2014/0157814 A1 Jun. 12, 2014

(51) Int. Cl.
*F24H 4/04* (2006.01)

(52) U.S. Cl.
CPC *F24H 4/04* (2013.01); *Y02B 30/123* (2013.01)

(58) Field of Classification Search
CPC .... F24H 4/04; F25B 2500/13; F25B 2500/01; F25B 2500/17; F25D 23/003; F25D 23/006; F16F 15/04; F16F 13/00; F16F 1/36; F16F 1/373
USPC ........... 62/296, 298, 499, 469; 248/673, 674, 248/677, 678, 680, 681, 615, 636, 638; 417/360, 363, 902
See application file for complete search history.

(56) References Cited

U.S. PATENT DOCUMENTS

| | | | | | |
|---|---|---|---|---|---|
| 1,548,833 | A | * | 8/1925 | Flegel | 416/120 |
| 2,257,374 | A | * | 9/1941 | Fritz | 62/295 |
| 2,632,306 | A | * | 3/1953 | Ruff | 62/179 |
| 2,935,279 | A | * | 5/1960 | La Porte et al. | 248/632 |
| 3,198,324 | A | * | 8/1965 | Kallenbach et al. | 206/320 |
| 3,713,620 | A | * | 1/1973 | Tkach | 248/678 |
| 3,758,058 | A | * | 9/1973 | Neudeck et al. | 410/46 |
| 4,173,872 | A | * | 11/1979 | Amthor, Jr. | 62/238.6 |
| 4,320,630 | A | * | 3/1982 | Uselton et al. | 62/238.6 |
| 5,524,860 | A | * | 6/1996 | Ives | 248/674 |
| 5,906,109 | A | * | 5/1999 | Dieckmann et al. | 62/238.6 |
| 5,913,892 | A | * | 6/1999 | Kwon | 62/296 |
| 6,499,714 | B1 | * | 12/2002 | Wike | 248/632 |
| 7,263,851 | B2 | * | 9/2007 | Yun et al. | 62/295 |
| 7,478,790 | B2 | * | 1/2009 | Yun | 248/624 |
| 8,876,092 | B2 | * | 11/2014 | Wojcieson | 267/136 |
| 2004/0168464 | A1 | * | 9/2004 | Seo et al. | 62/295 |
| 2008/0159887 | A1 | * | 7/2008 | Schogler et al. | 417/415 |
| 2011/0017340 | A1 | * | 1/2011 | Mirossay et al. | 138/149 |

* cited by examiner

*Primary Examiner* — Frantz Jules
*Assistant Examiner* — Nelson Nieves
(74) *Attorney, Agent, or Firm* — Dority & Manning, P.A.

(57) ABSTRACT

A heat pump water heater assembly is provided. The heat pump water heater assembly comprises a water tank, a cover having opposing first and second surfaces, a compressor, a connector configured to connect the compressor to the first surface of the cover, and at least one bracket comprising a first section mounted to the second surface of the cover by the connector and a second section extending outward from the first section and into a space between the water tank and the cover.

20 Claims, 5 Drawing Sheets

HEAT PUMP WATER HEATER ASSEMBLY

BACKGROUND OF THE INVENTION

The subject matter disclosed herein relates generally to appliances and more particularly to assemblies for water heaters.

Heat pump water heaters are gaining broader acceptance as a more economic and ecologically-friendly alternative to electric water heaters. These systems utilize a condenser configured in a heat exchange relationship with the water storage tank, for example wrapped around the tank in a series of coils. During operation of the vapor compression heat pump cycle, a refrigerant exits an evaporator as a superheated vapor and/or high quality vapor mixture. Upon exiting the evaporator, the refrigerant enters a compressor where the pressure and temperature increase and the refrigerant becomes a superheated vapor. The superheated vapor from the compressor enters the condenser, wherein the superheated vapor transfers energy to the water within a storage tank and returns to a saturated liquid and/or high quality liquid vapor mixture. Conventional refrigerants are able to reject heat to the water in the storage tank via condensation in the condenser.

Water heater storage tanks are used for storing and supplying hot water to residential and commercial properties. These units are shipped from location to location. Since in such units, the compressor is located above the cover of the tank, a compression load during transit could severely damage the cover and a shear load could displace the compressor. Thus, the cover must not only support the weight of the compressor under normal conditions, but also withstand potential impaction of the unit during shipping.

Accordingly, it would be advantageous to have a strengthened and reinforced heat pump water heater assembly that can better withstand impact that may occur during shipping or transportation and support the weight of the assembly.

In addition, it would be advantageous to have a high quality, low cost heat pump water heater assembly that withstands impact that may occur during movement of the assembly.

BRIEF DESCRIPTION OF THE INVENTION

As described herein, the exemplary embodiments of the present invention overcome one or more disadvantages known in the art.

According to one aspect of the invention, a heat pump water heater assembly is provided. The heat pump water heater assembly comprises a water tank, a cover for the water tank comprising opposing first and second surfaces, a compressor, a connector configured to connect the compressor to the first surface of the cover, and at least one bracket. The bracket has a first section mounted to the second surface of the cover by the connector, and a second section extending outward from the first section and into a space between the water tank and the cover.

According to another aspect of the invention, a heat pump water heater assembly is provided. The heat pump water heater assembly comprises a water tank, a cover for the water tank having opposing first and second surfaces, a foam disposed in a space between the water tank and the cover, a compressor, a connector configured to connect the compressor to the first surface of the cover, and at least one bracket. The bracket has a first section mounted to the second surface of the cover by the connector and a second section extending outward from the first section and into the space between the water tank and the cover and embedded in the foam. The cross section of the bracket reinforces the support of the weight of the compressor.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

The present embodiments provide for an improved heat pump water heater assembly. As previously indicated, water heater storage tanks are used for storing and supplying hot water to residential and commercial properties and these units are shipped from location to location. On the heat pump water heater assembly, the compressor must be supported to withstand impact of the unit, especially during shipping or transportation. Further, the cover for the water tank must be able to withstand the weight of the compressor.

Figure 1:
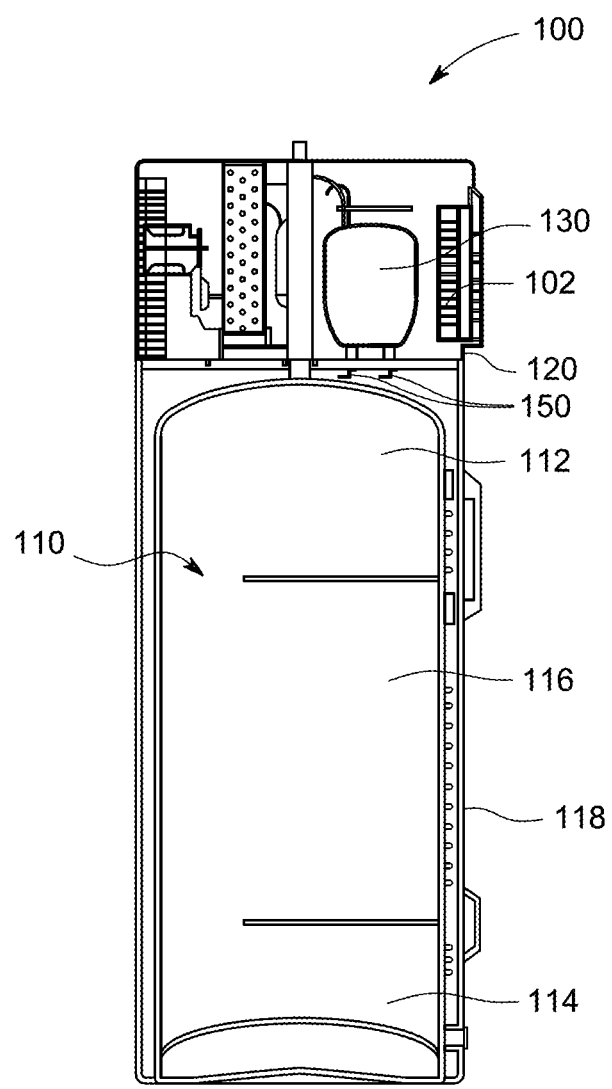
FIG. 1 is a side elevation view of an exemplary heat pump water heater assembly.

FIG. 1 depicts a heat pump water heater (HPWH) assembly 100 that incorporates embodiments of the invention, as well as components of a conventional HPWH assembly. It is contemplated, however, that the present embodiments may be practiced in other types of water heater assemblies other than just heat pump water heater (HPWH) assembly 100 described and illustrated herein. Accordingly, the following description is for illustrative purposes only, and the present embodiments are not limited to use in a particular type of water heater assembly, such as heat pump water heater (HPWH) assembly 100.

The assembly 100 includes an evaporator 102, a compressor 130, a condenser (not shown), a throttling device (not shown), and at least one fan (not shown). The condenser is assembled in a heat exchange relationship with the water tank 110 to heat the water within the tank. During operation of the heat pump cycle, a refrigerant exits the evaporator 102 as a fluid in the form of a superheated vapor and/or high quality vapor mixture. Upon exiting the evaporator 102, the refrigerant enters the compressor 130 wherein the pressure and temperature of the refrigerant are increased such that the refrigerant becomes a superheated vapor. The superheated vapor from the compressor 130 enters the condenser wherein it transfers energy to the water within a water tank 110 and condenses into a saturated liquid and/or high quality liquid vapor mixture. This high quality saturated liquid vapor mixture exits the condenser and travels through the throttling device. Upon exiting the throttling device, the pressure and temperature of the refrigerant drop at which time the refrigerant enters evaporator 102 and the cycle repeats itself. In an alternate embodiment, the HPWH assembly 100 is a transcritical system wherein the refrigerant (typically CO2) has a low critical point and thus operates on a transcritical cycle wherein it evaporates in the subcritical region and rejects (transfers) heat at temperatures above the critical point in a "gas cooler" instead of a condenser.

The water tank 110 in the assembly 100 of FIG. 1 may be a conventional water storage tank and includes a cold water inlet (not shown) for directing cold water to the bottom of the tank 110 via a dip tube (not shown) such that the water is preheated by the water in the tank before it discharges into the tank at the outlet of the dip tube (not shown). The water tank 110 has a top 112, bottom 114, and a mid-level point (heightwise) 116. The water tank 110 may be surrounded by a shell component 118. Any manner of suitable thermal insulating material may be disposed within the space between the shell and water tank 110, as is well known in the art. With respect to FIG. 1, it should be appreciated that the invention encompasses any manner of heat pump water heater assembly 100 that incorporates a water storage tank in accordance with aspects of the invention, and that the configuration of the assembly 100 depicted in FIG. 1 is for illustrative purposes only. For example, the compressor 130 and cover 120 may be located beside the water tank 110, rather than located above the water tank 110 as depicted in FIG. 1.

The assembly 100 may also include supplemental electric heating elements (not shown) placed near the top and bottom of the water tank 110 to heat the water.

The heated water exits the water tank 110 at a hot water exit (not shown) and flows to the consumer's residential plumbing, or other location where the assembly 100 is installed. The assembly 100 may include a temperature sensor (not shown) positioned to sense the temperature of the water in the upper region of the tank and may also have additional temperature sensors placed at various locations for sensing other temperatures, such as heat pump condenser inlet and outlet temperatures, ambient temperature, etc. The assembly 100 may also include a controller (not shown), equipped with a microprocessor, that determines which of the compressor 130 and/or electric resistance heating elements (not shown) shall be energized, and for how long, in order to heat the water within the water tank 110 to a setpoint temperature. The controller (not shown) may receive any manner of temperature readings (e.g., from sensor), flow signals, setpoint, and so forth, to implement its control functions.

Figure 2A:
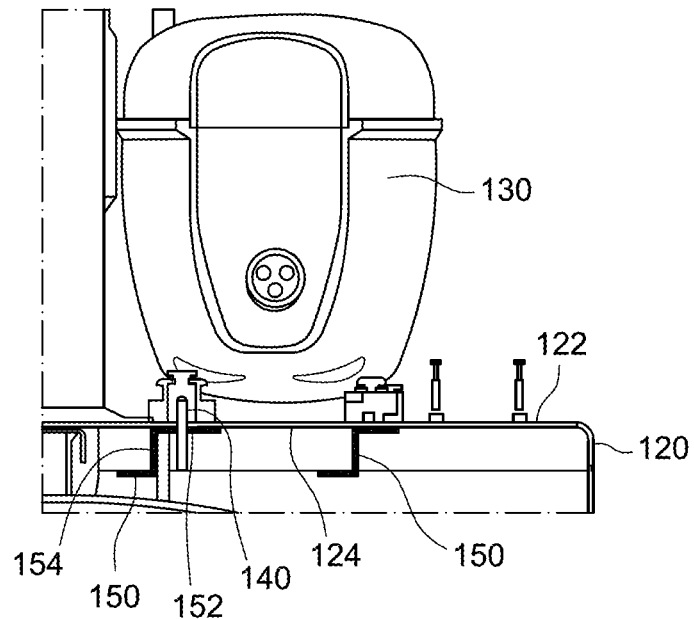
FIG. 2A is a cross section view of an exemplary compressor and cover assembly for use with the heat pump water storage tank assembly of FIG. 1.
Figure 2B:
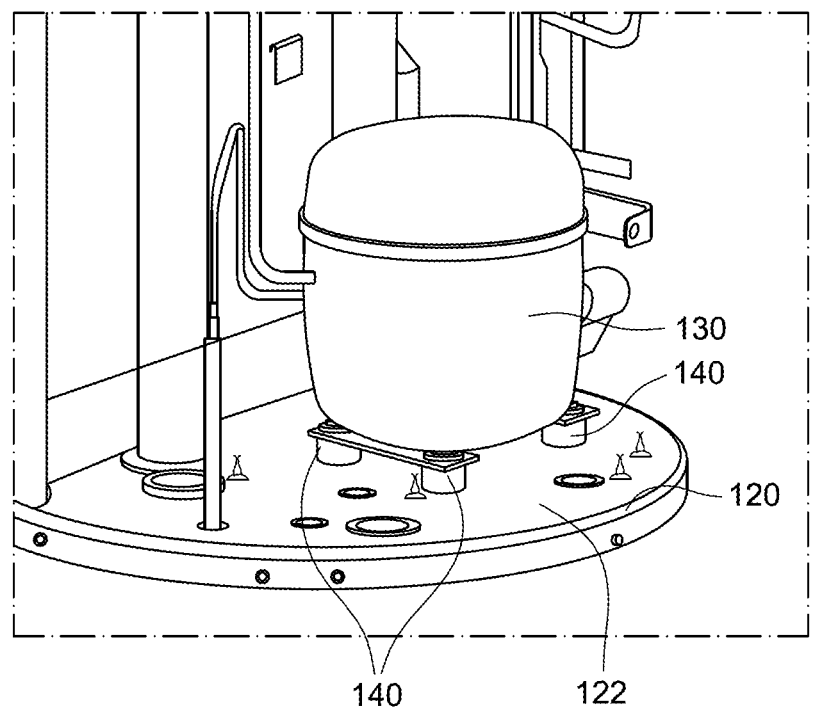
FIG. 2B is an enlarged view of an exemplary compressor and cover assembly for use with the heat pump water storage tank assembly of FIG. 1.

FIGS. 2A and 2B are views of exemplary compressor 130 and cover 120 assemblies for use with the heat pump water storage tank assembly 100 of FIG. 1. As shown in FIG. 2A, the cover 120 for the water tank 110 has opposing surfaces, a first surface 122 and a second surface 124. The first surface 122 is the uppermost surface and the second surface 124 is the undersurface of the cover 120. The compressor 130 is located above the water tank 110 and the cover 120 and is connected to the first surface 122 of the cover by the connector 140. A bracket 150 is located on the second surface 124 of the cover 120 beneath the compressor. The first section 152 of the bracket 150 is mounted or attached to the second surface 124 of the cover by the connector 140. The second section 154 of the bracket 150 extends outward from the first section 152 and into a space between the water tank 110 and the cover 120.

Figure 3A:
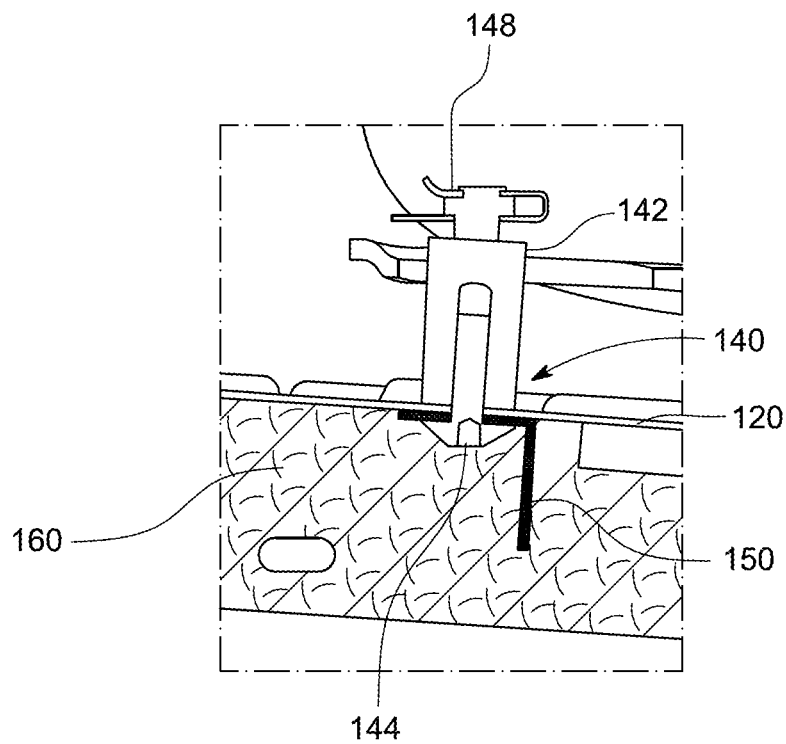
FIGS. 3A and 3B are enlarged cross section views of an exemplary connector and bracket assembly for use with the heat pump water storage tank assembly of FIG. 1.
Figure 3B:
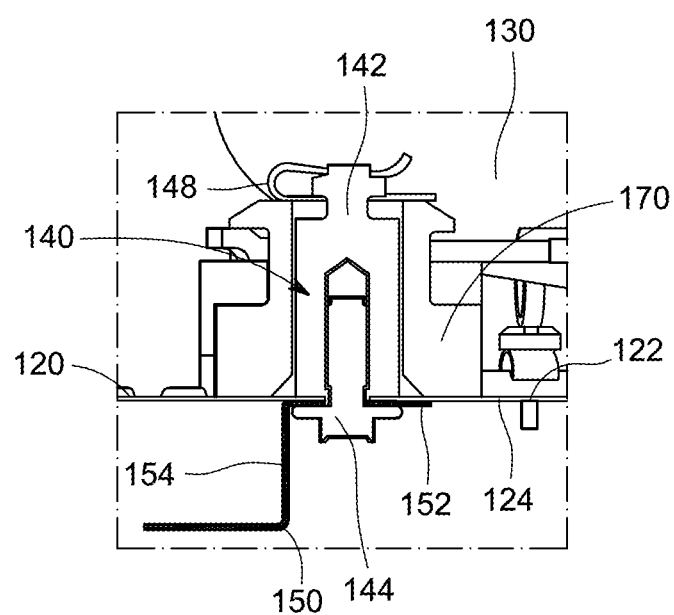

FIGS. 3A and 3B are cross section elevation views of exemplary connector 140 and bracket 150 assemblies for use with the heat pump water storage tank assembly 100 of FIG. 1. The connector 140 is configured to connect the compressor 130 to the first surface 122 of the cover 120. The connector 140 comprises any means for connecting the compressor 130 to the first surface 122 of the cover 120. In one embodiment, the connector 140 comprises a fastener 144. The fastener 144 may be a screw, bolt, rivet, toggle lock, spot weld, or another other fastening means known in the art. In another embodiment, the connector 140 comprises a compressor stud 142 connected to the compressor 130 and disposed against the first surface 122 of the cover 120, and a fastener 144 inserted into the compressor stud 142 and disposed against the second surface 124 of the cover 120. In an alternate embodiment, the connector 140 may be any male threaded fastener that may thread into the stud. As described, the connector 140 may be a direct connection, such as when the connector 140 is a fastener 144. Alternatively, the connector 140 may be separate pieces, such as the compressor stud 142 and the fastener 144 combination.

In one embodiment, as shown in FIGS. 3A and 3B, the connector 140 further comprises a clip 148 connecting the compressor 130 to the compressor stud 142. As shown in FIG. 3B, the compressor 130 fits between the compressor clip 148 and cover 120. In another embodiment, the fastener 144 may be a threaded screw that threads into or under the compressor stud 142, sandwiching the cover 120 and holding the stud 142 onto the cover 120. The compressor clip 148 contacts the upper portion of the compressor stud 142 and engages the compressor 130. In an alternate embodiment, the stud 142 has a body and a neck, and the compressor clip 148 fits onto the neck and forms a snap.

In another embodiment, as shown in FIG. 3B, the heat pump water heater assembly 110 further comprises a vibration damper 170. The vibration damper 170 surrounds the compressor stud 142. The vibration damper 170 may be a grommet that acts as a damper when the compressor 130 is mounted to the compressor stud 142 via the clip 148.

Figure 4A:
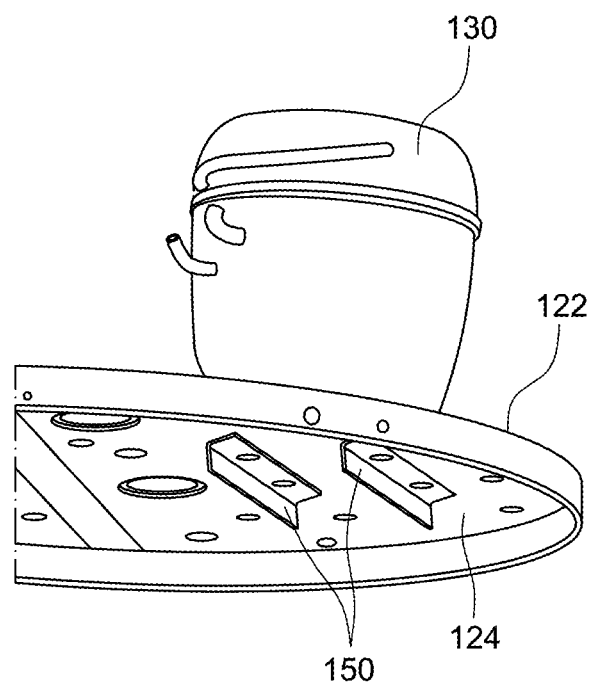
FIGS. 4A and 4B are enlarged views of exemplary compressor, cover and bracket assembly for use with the heat pump water storage tank assembly of FIG. 1.
Figure 4B:
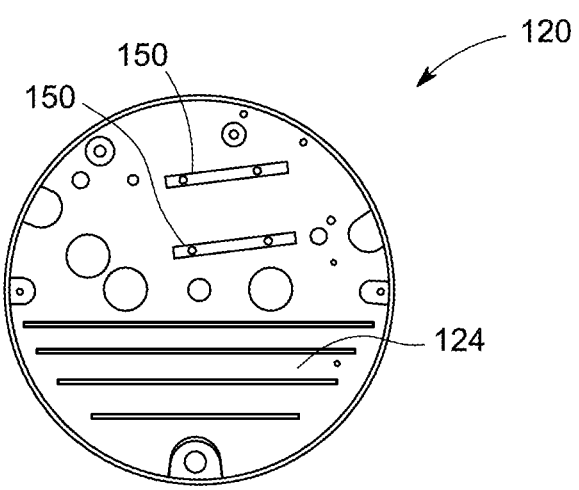

The heat pump water heater assembly 100 comprises at least one bracket 150. In an alternate embodiment, the heat pump water heater assembly 100 comprises two or more brackets 150 as shown in FIGS. 4A and 4B. FIGS. 4A and 4B are enlarged exemplary compressor 130, cover 120 and bracket 150 assemblies for use with the heat pump water storage tank assembly 100 of FIG. 1. As shown in FIGS. 3A and 3B, the bracket 150 is located on the second surface 124 of the cover 120. The first section 152 of the bracket 150 is mounted to the second surface 124 of the cover by the connector 140. The fastener 144 sandwiches the first section 152 of the bracket 150 to the second surface 124 of the cover 120. The second section 154 of the bracket 150 extends outward from the first section 152 and into a space between the water tank 110 and the cover 120. In one embodiment, the bracket 150 is sandwiched between the fastener 144 and the compressor stud 142, the fastener 144 supporting the bracket 150 and mounting the compressor stud 142 in place.

Figure 5A:
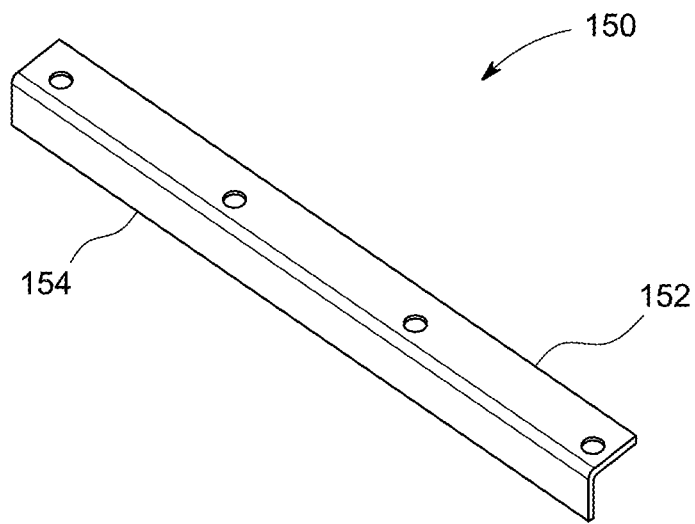
FIGS. 5A and 5B are exemplary brackets for use with the heat pump water storage tank assembly of FIG. 1.
Figure 5B:
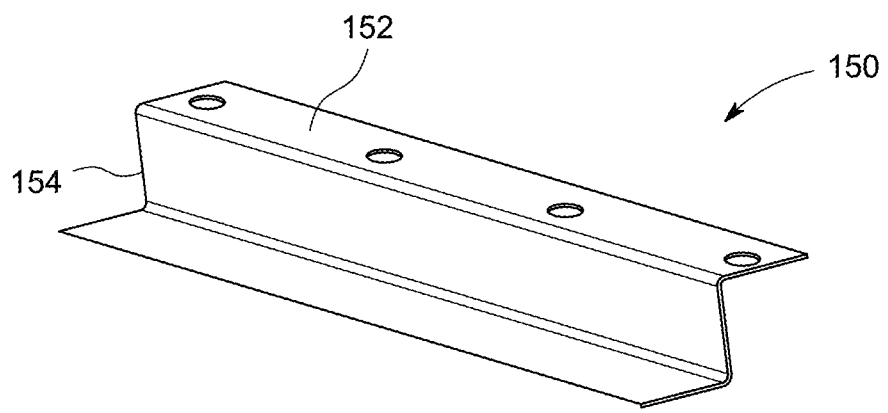

The bracket 150 has a specific cross section to reinforce the support of the weight of the compressor 130. Further, the bracket 150 has a cross section in which the second section 154 of the bracket 150 adds rigidity to the first section 152 of the bracket 150. In one embodiment, the bracket 150 has a generally Z-shaped cross section as shown in FIGS. 3B and 5B. In an alternate embodiment, the bracket 150 has an upside down generally L-shaped cross section as shown in FIGS. 3A and 5A. In another embodiment (not shown), the bracket 150 has a C-shaped cross section. FIGS. 5A and 5B are enlarged exemplary brackets 150 for use with the heat pump water storage tank assembly 100 of FIG. 1.

In one embodiment, an expandable insulating foam 160 may be disposed in the space between the water tank 110 and the cover 120. The second section 154 of the at least one bracket 150 may be embedded in the foam 160. The foam 160 encases and anchors the bracket 150 and reinforces the cover 120, as shown in FIG. 3A. Any manner of suitable foams 160, for example, a polyurethane foam or other insulated foams or expandable foams, may be disposed within the space between the cover 120 and water tank 110, as is well known in the art.

Embodiments of the present invention provide for a bracket 150 that reinforces, adds rigidity, and strengthens the cover 120 of the heat pump water heater assembly 100 so that is able to support the weight of the compressor 130. Further, the compressor 130 and cover 120 are supported by the bracket 150 in order to withstand impact and movement of the heat pump water heater assembly 100 during shipping. The foam 160 provides extra reinforcement to anchor the bracket 150.

Thus, while there has been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A heat pump water heater assembly comprising:
   a water tank having a top, a bottom and at least one sidewall;
   a shell component surrounding at least a portion of the sidewall;
   a cover comprising opposing first and second surfaces, the cover being spaced apart from the top of the water tank and supported by the shell component;
   a compressor;
   a connector configured to connect the compressor to the first surface of the cover;
   at least one bracket comprising:
      a first section mounted to the second surface of the cover by the connector; and
      a second section extending outward from the first section and into a space between the top of the water tank and the second surface of the cover; and
   a foam disposed in the space between the top of the water tank and the second surface of the cover, the foam encasing and anchoring the at least one bracket.

2. The heat pump water heater assembly of claim 1, wherein the at least one bracket has a generally Z shaped cross section.

3. The heat pump water heater assembly of claim 1, wherein the at least one bracket has a generally L shaped cross section.

4. The heat pump water heater assembly of claim 1, wherein the connector comprises a fastener.

5. The heat pump water heater assembly of claim 4, wherein the fastener comprises a screw.

6. The heat pump water heater assembly of claim 1, wherein the connector comprises a compressor stud connected to the compressor and disposed against the first surface of the cover, and a fastener inserted into the compressor stud and disposed against the second surface of the cover.

7. The heat pump water heater assembly of claim 6, wherein the fastener is a screw.

8. The heat pump water heater assembly of claim 6, wherein the connector further comprises a clip connecting the compressor to the compressor stud.

9. The heat pump water heater assembly of claim 6, further comprising a vibration damper surrounding the compressor stud.

10. The heat pump water heater assembly of claim 1, wherein the at least one bracket comprises two brackets.

11. A heat pump water heater assembly comprising:
    a water tank having a top, a bottom and at least one sidewall;
    a shell component surrounding at least a portion of the sidewall;
    a cover for the water tank spaced apart from the top of the water tank and supported by the shell component, the cover comprising opposing first and second surfaces;
    a foam disposed in a space between the top of the water tank and the second surface of the cover;
    a compressor;
    a connector configured to connect the compressor to the first surface of the cover; and
    at least one bracket comprising:
       a first section mounted to the second surface of the cover by the connector; and
       a second section extending outward from the first section and into the space between the top of the water tank and the second surface of the cover and embedded in the foam.

12. The heat pump water heater assembly of claim 11, wherein the at least one bracket has a generally Z shaped cross section.

13. The heat pump water heater assembly of claim 11, wherein the at least one bracket has a generally L shaped cross section.

14. The heat pump water heater assembly of claim 11, wherein the connector comprises a fastener.

15. The heat pump water heater assembly of claim 14, wherein the fastener comprises a screw.

16. The heat pump water heater assembly of claim 11, wherein the connector comprises a compressor stud connected to the compressor and disposed against the first surface of the cover, and a fastener inserted into the compressor stud and disposed against the second surface of the cover.

17. The heat pump water heater assembly of claim 16, wherein the connector further comprises a clip connecting the compressor to the compressor stud.

18. The heat pump water heater assembly of claim 16, further comprising a vibration damper surrounding the compressor stud.

19. The heat pump water heater assembly of claim 11, wherein the at least one bracket comprises two brackets.

20. The heat pump water heater assembly of claim 1, wherein the at least one bracket has a generally C shaped cross section.

* * * * *